United States Patent [19]

Parker et al.

[11] Patent Number: 5,007,706
[45] Date of Patent: Apr. 16, 1991

[54] POLYMERIC OPTICAL FIBER

[75] Inventors: Theodore L. Parker, Lafayette, Calif.; Donald J. Perettie, Midland, Mich.

[73] Assignee: The Dow Chemical Company, Midland, Mich.

[21] Appl. No.: 143,997

[22] PCT Filed: Feb. 19, 1987

[86] PCT No.: PCT/US87/00372
§ 371 Date: Oct. 8, 1987
§ 102(e) Date: Oct. 8, 1987

[87] PCT Pub. No.: WO87/05117
PCT Pub. Date: Aug. 27, 1987

[51] Int. Cl.$^5$ .................................................. G02B 1/04
[52] U.S. Cl. .................................. 350/76.34; 428/394; 525/902
[58] Field of Search ............... 350/96.10, 96.30, 96.34; 428/392, 394, 373, 375; 525/902

[56] References Cited

U.S. PATENT DOCUMENTS

| | | | |
|---|---|---|---|
| 4,505,543 | 3/1985 | Ueba et al. | 350/96.34 |
| 4,542,957 | 9/1985 | Ishiwari et al. | 350/96.34 |
| 4,564,263 | 1/1986 | Ueba et al. | 350/96.34 |
| 4,681,400 | 7/1987 | Ueba et al. | 350/96.34 |
| 4,693,553 | 9/1987 | Sasaki et al. | 350/96.34 |
| 4,744,632 | 5/1988 | Yamamoto et al. | 350/96.30 X |
| 4,756,599 | 7/1988 | Maeda et al. | 350/96.34 X |

Primary Examiner—John D. Lee
Assistant Examiner—Phan T. Heartney
Attorney, Agent, or Firm—Douglas N. Deline

[57] ABSTRACT

Improved polymeric optical fibers comprising a core of a copolymer prepared by anionic polymerization of alpha-methylstyrene and a monovinylidene aromatic comonomer at a temperature above 61° C. and a cladding polymer are disclosed. The fibers have superior combination of high heat resistance, high flexibility, and low transmission loss in bent form.

5 Claims, No Drawings

POLYMERIC OPTICAL FIBER

The present invention relates to optical fibers prepared from polymers. More particularly, it relates to heat resistant, flexible, polymeric optical fibers comprising a core and a cladding.

It is previously known in the art to prepare polymeric optical fibers. For example, see recently issued U.S. Pat. No. 4,505,543 (Ueba et al.). Ueba teaches the use of core polymers of an alkyl methacrylate and certain styrene derivatives. Styrene derivatives such as alpha-methylstyrene and paramethylstyrene are expressly excluded (at column 5, lines 20-25). Ueba also discloses the use of a cladding polymer that is a copolymer of vinylidene fluoride or a perfluoroolefin.

It is previously known that polymeric optical fibers can suitably be prepared only from judiciously selected polymer pairs. A practical polymeric optical fiber must possess simultaneously a number of optimized physical properties. Firstly, the components of polymeric optical fiber must be of a sufficiently high transparency that attenuation of the optical signal over the lengths that optical transmission is desired is not significant. Secondly, the polymer materials of the optical fiber must not be significantly adversely affected at elevated temperatures or other enviromental extremes to which the polymer optical fiber is to be exposed. For example, it is known that many polymer materials demonstrate greatly decreased optical transmission upon exposure to elevated temperatures. For example, the maximum temperature at which poly (methyl methacrylate) and polystyrene can be safely used is about 80° C. At temperatures greater than about 80°, such polymers are deformed and their microstructure caused to fluctuate, thereby affecting the optical properties of the fiber even when the fiber is again brought to room temperature.

A third requirement for a suitable polymeric optical fiber is that the polymer used for the cladding must be suitably chosen both in respect to its index of refraction and its ability to bond to the core polymer material. Typically, such core material and cladding material should have refractive indices differing by at least 3 percent. That is, the cladding should be made of a transparent polymeric material having a refractive index of at least 3 percent less than that of the core. It is equally important that the cladding material adhere to the core material such that repeated flexing and bending of the resulting fiber optic does not cause delamination at the interface between the core and cladding material. Such delamination could result in attenuation of the optical signal.

Fourthly, it is desirable in a polymeric optical fiber to employ polymer constituents having low hygroscopicity. Particularly when operating at elevated temperatures, water absorption by certain polymers may lead to unwanted expansion of the polymers as well as adversely affect the polymers optical properties. For example, differing rates of water absorption may lead to differing rates of polymer swelling and contribute to weakening of the adhesive bond between core and cladding. To a certain extent adverse effects caused by hygroscopicity may be reduced by encasing a polymeric optical fibers inside of protective coatings in order to avoid the effects of exposure to high humidity. However, it would be desirable to provide a polymeric optic fiber having reduced hygroscopicity in order that any detrimental effects caused by water absorption may be reduced.

Fifthly, it would be desirable to have a highly flexible filament, such as one that could be tied into a closed knot on itself without breakage of the polymeric optical fiber.

According to the present invention there is now provided a polymer optical fiber having a core and cladding structure characterized by (a) the core essentially comprising a copolymer of at least one monovinylidene aromatic monomer and alpha-methylstyrene prepared by anionically polymerizing the monovinylidene aromatic monomer and from 30 to 70 weight percent of alpha-methylstyrene based on the combined weight of monomer, at a temperature greater than 61° C. and less than the ceiling temperature of the monovinylidene aromatic monomer; and (b) the cladding essentially comprising a polymer having a refractive index of at least 3 percent less than the refractive index of the copolymer core and having sufficient adhesion to the copolymer core such that less than 15 percent attenuation of light transmission occurs upon bending of the polymeric optical fiber to a radius equal to thrice the radius of the polymeric optical fiber.

The monovinylidene aromatic monomers employed to prepare the copolymers used in the core of the present polymeric optical fibers include styrene and ring alkyl or halogen substituted styrene compounds containing up to about four $C_{1-4}$ alkyl or halogen substituents. Examples include styrene, 2-vinyl toluene, 3-vinyl toluene, 4-vinyl toluene, t-butyl styrene, bromostyrene, chlorostyrene, (including various isomers) etc., as well as mixtures of such vinyl aromatic monomers. A preferred monovinylidene aromatic monomer is styrene.

The term "ceiling temperature" employed herein means the temperature above which the polymerization of the subject monomer to form high molecular weight homopolymers is thermodynamically disfavored compared to the reverse depolymerization process. However alpha-methylstyrene which has a homopolymerization ceiling temperature of about 61° C., will form oligomeric reaction products, especially and even essentially the dimer thereof under anionic polymerization conditions at a temperature above 61° C. Other monovinylidene aromatic comonomers usually possess ceiling temperatures that are higher than 61° C. Styrene in particular has a homopolymerization ceiling temperature of about 350° C. Thus, thermodynamically stable copolymers of vinyl aromatic monomers and alpha-methylstyrene are formed under anionic polymerization conditions at a temperature above about 61° C. comprising in general no more than two adjacent alpha-methylstyrene polymerization moieties.

The copolymers employed in the present invention can be conventionally prepared by anionic polymerization such as that shown in U.S. Pat. No. 4,572,819 and European Patent No. 0087165. Where a feed stream is employed containing high amounts of alpha-methylstyrene the copolymers prepared for use according to the present invention contain nearly the theoretical maximum amount of alpha-methylstyrene, i.e. a ratio of nearly two alpha-methylstyrene units for each monovinylidene aromatic monomer unit. In the styrene/alpha-methylstyrene system, this molar ratio results in an alpha-methyl-styrene content of approximately 70 weight percent. Additional amounts of alpha-methylstyrene are not believed to be incorporated under the polymerization conditions chosen due to the thermodynamically favored formation of two repeating alpha-methylstyrene monomer units in the polymer chain during the reaction. Accordingly, it may be seen that generally no more than two alpha-methylstyrene monomer units are located adjacent to one another in the resulting polymer. Of course, reduced amounts of alpha-methylstyrene may be employed if desired resulting in a random copolymer containing a statistical distribution of monovinylidene aromatic monomer and alpha-methylstyrene monomer units less than the above maximum alpha-methylstyrene content. The copolymers of the present invention are further characterized by a random distribution of vinyl aromatic monomer remnants and alpha-methylstyrene remnants. Preferably, the copolymers, employed in the present invention contain at least about 5 percent alpha-methylstyrene units by weight and preferably, at least about 20 percent alpha-methylstyrene units by weight. The weight average molecular weight of the copolymers is at least about 40,000 and preferably at least about 100,000. In determination of molecular weights of the copolymers used herein the technique of size exclusion chromatography is employed and the value obtained is a comparative value to that of a polystyrene molecule that would occupy the same volume as that of the polymer molecule being measured. The resulting copolymers are stable at elevated temperature conditions and demonstrate good heat distortion properties.

The anionic polymerization may be initiated by use of an organometallic anionic polymerization initiating compound according to well-known techniques. Suitable organometallic anionic polymerization initiating compounds are previously known and disclosed in the art. Such known compounds include the alkyl lithiums and other alkali metal derivatives of aromatic or aliphatic compounds. A preferred initiator is n-butyllithium.

In the polymerization, the initiator is added to an anionically polymerizable monomer mixture retained under polymerization conditions. Suitably, a back mixed reactor such as a stirred tank reactor may be employed and the monomers continuously added to the reactor and the reaction mixture discharged from the reactor at about the same rate as the monomers are added. Alternatively, a continuously recirculated coil reactor may be employed or additional reactors employed as are known in the art. In practice, an upper temperature limit on the polymerization is around 200° C.

As is previously known, ingredients for use in anionic polymerizations may be first purified by suitable purification means such as by distillation, the use of molecular sieve beds, etc., in order to remove contaminants that would interfere with the intitator. Alternatively, aluminum alkyl scavenging agents such as those disclosed in U.S. Pat. No. 4,239,870, may be employed in order to purify the ingredients of the polymerization mixture. The highly purified monomers and inert solvent, if desired, are then charged to a reaction vessel and the reactor sealed and heated to a temperature above 61° C., the ceiling temperature of alpha-methylstyrene. Suitable solvents are those previously known in the art exemplified by cyclohexane, benzene, ethylbenzene, toluene, etc. In a desirable operating embodiment, excess alpha-methylstyrene may be employed as an inert diluent. Inasmuch as the excess alpha-methylstyrene is not incorporated into the final copolymer, due to the aforementioned limitation imposed by the ceiling temperature, the same acts as the solvent for the reaction process. A preferred reaction mixture comprises on a weight basis from about 50 percent to about 99.5 percent alpha-methylstyrene and from about 50 percent to about 0.5 percent vinyl aromatic monomer.

The copolymer may be recovered from the reactor effluent by terminating the polymerization through addition of a chain terminating agent such as an alcohol and devolatilization or precipitation of the resulting syrup.

The cladding polymer may be any suitable thermoplastic polymer having refractive index and adhesion properties as previously specified. More particularly, it is desirable that the refractive index be at least 5 percent less than the refractive index of the copolymer employed as the core. Suitable polymer cladding materials include homopolymers of alkyl methacrylates containing from 1 to about 12 carbons in the alkyl moiety and copolymers thereof with up to about 50 percent by weight of a different alkyl methacrylate, an alkyl acrylate containing from about 1 to about 12 carbons in the alkyl group, acrylic acid, or a monovinylidene aromatic monomer. Also included are polyaliphatic imides such as copolymers of methylmethacrylate and N-methyl dimethyl gluterimide, available from Rohm and Haas under the tradename designation XHTA copolymers.

The preferred cladding polymer is a homopolymer of methyl methacrylate. Conversely, in contrast to aforementioned Ueba et al., cladding materials which have been found to be nonsuitable include polymethylpentene and polyvinylidene fluoride. Claddings of these two polymers have been found to possess insufficient adhesion to the copolymer core resulting in mechanical separation of the core and cladding and loss of an optical signal in the optical fiber.

The polymeric optical fibers of the present invention may be produced by any suitable method. Generally two methods are in common use. The first method comprises carrying out composite spinning with use of a core/cladding type spinneret. A polymer mainly composed of the core copolymer component is usually fed in pellet form or other suitable form to a meltspinning machine. The spun fibers may be stretched if desired. Stretching usually to 1.2 to 20 times the original length generally improves impact mechanical properties such as tensile strength and bending resistance.

The meltspinning temperature which somewhat varies depending upon properties of core component polymer and cladding or sheath component polymer is usually 190° to 260° C. and preferably 210° to 250° C. in order to stably carry out the composite spinning. The melt viscosity of the core component polymer is desirably the same as that of the sheath component polymer. This can be attained by suitably selecting control of fluid characteristic of the core component polymer by copolymerization ratio, control of molecular weight of the two polymers and choice of spinning temperature.

The second method comprises first meltspinning a core component polymer alone, then encasing the core with the cladding either by extrusion coating thus obtained fibers with a solution of sheath component polymer and thereafter removing said solvent.

The coating treatment may be preferably carried out after stretching the spun core polymer from the point of prevention of breakage of filaments or crazing and prevention of damaging of cover film which is the sheath component. Alternatively, the coating treatment may be carried out immediately after spinning and the resulting polymeric optical fiber employed as is or after being subjected to stretching or other post fabrication treatment.

Examples of solvents for preparation of coating solutions of sheath component polymers are acetone, ethyl acetate, dimethylacetamide, dimethylsulfoxide, etc., and mixtures thereof.

Regarding concentration of the polymer solution, any concentrations may be employed if the polymer is homogeneously dissolved. However, for uniform adhesion of the sheath component to the core component and easy removal of solvent, the concentration is preferably 10 to 60 percent by weight, more preferably 25 to 45 percent by weight.

Having described the invention, the following examples are included as further illustrations and are not to be construed as limiting.

EXAMPLES

A. Typical Copolymer Formation

Copolymers of styrene and alpha-methylstyrene are conventionally prepared by anionic polymerization substantially according to the following process steps, which essentially correspond to those shown in Example 2 of aforementioned U.S. Pat. No. 4,572,819. A feed stream comprising alpha-methylstyrene, phenylacetylene, free styrene (in an amount in considerable excess relative to the amount of alpha-methylstyrene) and ethylbenzene solvent is distilled and contacted with an alumina bed to remove water, oxygen and benzaldehyde impurities. The purified feed stream is pumped to a 2-liter Paar reactor equipped with a hollow auger agitator, the hollow auger comprising a cylinder slightly shorter in length than the interior of the reactor and slightly smaller in diameter. A land is helically disposed on the outside of the cylinder. The land is sized such that the cylinder generated by rotation of the hollow cylinder and land is slightly less than the internal volume of the reactor. Such an agitator is described in U.S. Pat. No. 4,239,863, the teachings of which are herewith incorporated by reference thereto. Hot water under pressure is employed to heat the reactor to 95° C. The purified feed stream and initiator are introduced into the side of the reactor at a rate to give a two-hour residence time. The initiator is normal-butyllithium pumped at a rate to provide a concentration of about 60 ppm. The pressure within the reactor is maintained at about 50 pounds per square inch gauge using a pressure control valve at the outlet. The stream from the reactor is fed to a terminator coil of 1 inch inside diameter, 316 Stainless Steel tubing connected in a square configuration and having an internal volume of about 467 cubic centimeters. Material is recirculated within the terminator coil while a solution of 1 weight percent ethanol in ethylbenzene is fed to the terminator coil at a rate about twice that of the normal-butyllithium fed to the polymerizing vessel. Effluent from the terminator coil is then pressure fed into a devolatilizer equipped with a flat plate heater and a screw extruder substantially according to that described in U.S. Pat. No. 3,014,702, the teaching of which is incorporated by reference thereto. The exterior of the heater is maintained at a pressure of less than 20 millimeters of mercury and the product mixture is heated to a temperature of about 250° C. to provide a polymer containing about 0.3 weight percent volatiles. The molecular weight of the resultant styrene alpha-methylstyrene polymer over a 24-hour period is maintained at plus or minus 5,000 of 140,000. By varying the amount of alpha-methylstyrene in the feed stream its content in the resulting copolymer may be varied up to a maximum content of about 70 percent by weight.

B. Typical Polymeric Optical Fiber Preparation

A conventional dual ram extruder with a coextrusion die suitable for preparation of core/clad polymeric optical fibers is charged with the styrene/alpha-methylstyrene copolymer previously prepared on the core side and with polymethyl methacrylate (Plexiglas® VM, available from Rohm and Haas) on the clad side. The styrene/alpha-methylstyrene copolymer is heated to a temperature of 210° C. and the polymethyl methacrylate is heated to a temperature of 193° C. Polymer transfer lines to the die are maintained at a temperature of about 220° C. for the styrene/alpha-methylstyrene copolymer and about 204° C. for the polymethyl methacrylate. The die spinneret is maintained at a temperature of about 204° C. The polymeric optical fiber is coextruded at a rate of about 4 to 8 meters per minute as controlled by a pinch wheel puller. The diameter of the polymeric optical fiber varies from about 0.5 to about 1.0 millimeter. The cladding thickness is about 1/10 to 1/20 of the optical fiber's radius.

EXAMPLES 1-3

When polymeric optical fibers are prepared according to Step A and Step B above, utilizing styrene/alpha-methylstyrene copolymers as the core component containing 30 percent (Example 1), 50 percent (Example 2), and 60 percent (Example 3) alpha-methylstyrene content respectively, the following typical properties were obtained for all the products.

"Flexibility" was excellent as judged by a knot test wherein a single filament of the polymeric optical fiber is tied into a closed knot and the filament does not break. Such test is more critical than the test procedure for flexibility in aforementioned Ueba et al. The results are surprising in view of the negative teachings of aforementioned Ueba et al. at column 2, lines 9-12.

"Percentage Transmission Loss" as a functional of fiber bend radius was measured essentially according to Mitsubishi Rayon Company's Technical Bulletin "ESKA Cables" (published 1982). This test is important because one of the best justifications for using fiber optic light transmission is the ability to "pipe light" around convoluted paths. Bending a fiber at a sharp angle can (1) cause mechanical failure of the fiber and (2) increase light loss by affecting the angle at which light strikes the clad layer at the bend. In any practical installation, a user needs to know just how severely a fiber can be bent, and still perform its intended function. This information can be provided in the form of a "loss vs. bend angle" plot. Essentially, it was found that less than 15 percent attenuation of light transmission occurred upon bending of the optical fiber to a radius equal to thrice the radius of the polymeric optical fiber.

The "Maximum Short-term Service Temperature" was 10° to 20° C. higher than that for comparable polymeric optical fibers having a polystyrene core.

The "Hygroscopicity" was expected to be lower than for comparable polymer optical fibers having a poly(methyl methacrylate) core.

Measurement of the attenuation of optical signal transmitted through the polymeric optical fiber of the invention gave a result of about 3 to 6 decibels per meter at a wavelength of about 632 nm and a temperature of 25° C.

We claim:

1. A polymeric optical fiber having a core and cladding structure characterized by (a) the core essentially comprising a copolymer of at least one monovinylidene aromatic monomer and alpha-methylstyrene prepared by anionically polymerizing the monovinylidene aromatic monomer and from 30 to 70 weight percent of alpha-methylstyrene based on the combined weight of monomer, at a temperature greater than 61° C. and less than the ceiling temperature of the monovinylidene aromatic monomer; and (b) the cladding essentially comprising a polymer having a refractive index of at least 3 percent less than the refractive index of the copolymer core and having sufficient adhesion to the copolymer core such that less than 15 percent attenuation of light transmission occurs upon bending of the polymeric optical fiber to a radius equal to thrice the radius of the polymeric optical fiber.

2. A polymeric optical fiber according to claim 1, wherein the core polymer is a copolymer of styrene and alpha-methylstyrene.

3. A polymeric optical fiber according to claim 1, wherein the cladding comprises an alkyl methacrylate copolymer containing from 1 to 12 carbon atoms in the alkyl group, or a copolymer thereof with up to 50 percent by weight of a different alkyl methacrylate, an alkyl acrylate containing from 1 to 12 carbons in the alkyl group, acrylic acid or a monovinylidene aromatic comonomer.

4. A polymeric optical fiber according to claim 1, wherein the cladding polymer comprises poly(methyl methacrylate).

5. A polymeric optical fiber according to claim 1 which has sufficient flexibility such that it can be tied into a closed knot without breakage of the fiber.

* * * * *